(12) United States Patent
Etzold (10) Patent No.: US 6,586,058 B1
(45) Date of Patent: *Jul. 1, 2003

(54) EQUIPMENT PACKAGES FOR SHOCK RESISTANCE

(75) Inventor: Karl-Friedrich Etzold, Briarcliff Manor, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 528 days.

(21) Appl. No.: 08/781,299

(22) Filed: Jan. 13, 1997

(51) Int. Cl.[7] .............................. B65D 85/30; H05K 7/14
(52) U.S. Cl. ...................... 428/34.1; 428/36.5; 206/521; 206/523; 206/576; 206/814; 361/752; 361/767; 361/800; 361/816; 248/636
(58) Field of Search .............................. 428/34.1, 36.5; 206/320, 576, 521, 814, 524, 523; 361/800, 816, 767, 752, 683; 248/636

(56) References Cited

U.S. PATENT DOCUMENTS

| | | | | |
|---|---|---|---|---|
| 5,402,317 A | * | 3/1995 | Rydberg | 361/785 |
| 5,437,367 A | * | 8/1995 | Martin | 206/320 |
| 5,706,168 A | * | 1/1998 | Erler et al. | 361/685 |
| 5,706,180 A | * | 1/1998 | Lacroix et al. | 361/800 |
| 5,725,090 A | * | 3/1998 | Vermillon et al. | 206/320 |

FOREIGN PATENT DOCUMENTS

JP  5-61073  * 8/1993

* cited by examiner

*Primary Examiner*—Rena Dye
(74) *Attorney, Agent, or Firm*—Manny W. Schecter, Esq.; McGinn & Gibb, PLLC (57) ABSTRACT

The invention provides novel equipment packages, principally for portable equipment such as laptop computers, which provide decoupling, damping and shock isolation of acceleration sensitive components within the packages. Two principal embodiments are disclosed. In the flexible shell embodiment, a plurality of flexible fillers are attached to a flexible shell and a plurality of objects or components are attached to the fillers. In the flexible chassis embodiment, a plurality of objects or components are mounted to the flexible chassis to form an assembly and a plurality of flexible fillers are attached to the chassis to form the complete package. One design methodology employs a decoupled simple harmonic oscillator (SHO) model to optimize the shock response behavior. A second design methodology uses a deterministic method (finite element method) to establish the parameters for the filler and shell materials.

35 Claims, 7 Drawing Sheets

FIG. 8

EQUIPMENT PACKAGES FOR SHOCK RESISTANCE

FIELD OF THE INVENTION

The present invention is directed to the field of equipment packaging. It is more particularly directed to shock resistant equipment design and packaging, especially in regard to portable equipment.

BACKGROUND OF THE INVENTION

It is a constant endeavor to find improved ways of constructing equipment that is resistant to shock. Components mounted within equipment packaged in traditional rigid chassis designs are exposed to high acceleration during shock events generated in normal use and handling. A here-to-fore known solution to reduce the peak acceleration values is to provide a flexible coupling mount with damping and an appropriate sway space for each individual component attached to a common rigid frame or chassis. This is not entirely satisfactory for many packaging applications for which it is being employed.

Portable equipment, and particularly portable computers, have to function in severe shock environments. It is generally desirable and often required that a portable computer be able to survive drops with drop heights between 18" (45.7 cm) and 32" (81.3 cm). For example, an IBM L40/SX laptop computer dropped just 12" (30.5 cm) onto a wooden workbench can experience an acceleration of 1074 g, with pulse durations of 0.3 ms. This acceleration is large enough to damage fragile components such as the disk file, the floppy disk drive and the display.

Mechanical packaging designs of many laptop computer systems are generally based on the properties of stationary equipment. These traditional laptop designs generally employ one of two approaches. The first design approach is to use a rigid chassis or frame. Typically, the chassis is a separate structure provided primarily to support the component devices and to serve as a connecting structure to the supporting floor or table. Some commercial products use this design approach by employing a diecast aluminum frame to support the internally mounted components. A somewhat analogous approach is employed in some other laptop computers. In such computers, the chassis is actually a combination of the case bottom and the printed circuit board. This combination is fairly stiff and does not constitute an energy absorbing design.

The second design approach uses the internal operating components as structural components. There is no chassis per se, and the components are fastened together so as to form the supporting structure. The resulting structure is also quite rigid and is not energy absorbing. In both these approaches, the stiff chassis behaves as a rigid object or elastic, non-dissipative assembly and transmits a received shock to all its components with little or no attenuation. When subjected to the shock, a high acceleration arises from the total system mass colliding with the impacting surface. In the limit of no internal motion, the acceleration is uniform throughout the system. If the system is elastic and non-dissipative very large secondary displacements can result due to the resulting resonances.

A traditional solution is to reduce the acceleration values on a particular costly component only. This is often done for a Direct Access Storage Device (DASD) mounted in a computer. The DASD is provided with a flexible, compliant, and damped coupling shock mount attached to the rigid frame or chassis. This solution also requires that an appropriate sway space be made available. A disadvantage of this design is that the chassis is kept rigid and non-dissipative, allowing unimpeded transmission of received shock pulses throughout the computer structure. This solution also requires that shock protection be provided separately to each component with a customized mounting, with that mounting's own compliance, damping and mechanical design. This results in a dramatic increase in the number of assembly parts and computer cost.

SUMMARY OF THE INVENTION

It is an object of the present invention to provide equipment packages and designs therefor that provide decoupling, damping and shock isolation of motion sensitive components within the package.

In one aspect, the present invention provides an equipment package comprising a flexible shell, a plurality of flexible fillers attached to the shell, and a plurality of objects or components attached to the fillers. Each of the plurality of fillers is formed from a material composition providing flexibility and shock damping to each of the objects. It is desirable for the shell to have a compliance and a damping coefficient matched to the objects.

In another aspect, the present invention provides an equipment package comprised of a flexible chassis, a plurality of objects or components mounted to the chassis to form an assembly, and a plurality of flexible fillers attached to the assembly to form or define the complete package. Each of the fillers is formed from a material composition which provides flexibility and shock damping to each object and provides structural support and integrity for the other objects. In one embodiment, the fillers or the chassis or both are of a laminated construction to achieve the desired anisotropic elastic properties.

It is desirable for the chassis to have a compliance and a damping coefficient matched to the objects. This can be achieved, for example, by varying the thickness of the flexible chassis depending upon location. The nature of the coupling between the objects and the chassis is determined by the resonant frequency and damping involving a particular vibrational mode and particular components.

The invention also provides for at least part of the flexible chassis to have apertures therein that are filled with damping and coupling materials. Alternatively, damping and coupling materials may be selectively attached to the flexible chassis or to the flexible shell. As with the flexible chassis, the flexible shell may be laminated.

Each of the plurality of flexible fillers is formed from a material composition that provides mechanical decoupling, flexibility and shock damping to at least one of the objects such that a shock imparted on a different object is attenuated when received by that object. It is desirable that the material composition includes a foam to keep the weight low and still achieve the desired damping properties. The flexible fillers may be formed of a variety of materials, e.g., laminated, to achieve the desirable anisotropic compliance and damping properties. Such fillers may also have cavities selectively placed therein.

Another aspect of the present invention is a method for making an equipment package comprising the steps of forming a flexible chassis, attaching a plurality of components to the chassis, forming a plurality of damping fillers having predetermined compliance and damping, to substantially fill the spaces between the components in such a manner that the fillers also form the outer surfaces of the package which may optionally be covered with an outer skin. In the flexible shell embodiment, the outer surfaces of the package are formed from the shell material.

One design methodology employs a decoupled simple harmonic oscillator (SHO) model to optimize the shock response behavior. A second design methodology uses a deterministic method (finite element method or FEM) to establish the parameters for the filler and shell materials.

BRIEF DESCRIPTION OF THE DRAWINGS

These and other objects, features, and advantages of the present invention will become more apparent upon further consideration of the following detailed description of the invention when read in conjunction with the drawings, in which.

DETAILED DESCRIPTION OF THE INVENTION

The present invention is an apparatus and method for equipment package structures specifically designed to provide mechanical decoupling, damping and shock isolation of the equipment's component parts. The decoupling, damping and shock isolation are such as to cause the energy of a shock imparted on one component to become attenuated and/or dissipated as it propagates toward the other component parts. This is a principal departure from the classical rigid chassis design. The entire system and chassis are generally designed to give the overall equipment substantially optimum compliance and damping.

It is noted that when a rigid body collides with another object, the entire mass of the object contributes to the collision energy at the instant of the collision. When a flexible object collides with another object, only the portion in immediate contact with the other object is rapidly decelerated. The rest of the system is still moving relatively to the other object with speed and acceleration dependent upon the compliance and damping of the system incorporating that flexible object. By carefully selecting these parameters (compliance and damping), the dissipation of the kinetic energy of the system can be optimized so as not to allow the shock energy to propagate unattenuated to and through all the components.

Therefore, a methodology of this invention is to treat each component individually in regard to its contribution to the collective mechanical properties of the equipment. Per the invention, the equipment is designed such that the assembled components of the assembly act as a highly damped flexible grouping. This avoids treating the equipment components as a system which behaves as a rigid body with a single total mass equal to the sum of the decoupled individual masses of all the components. The mounting of each individual component is desirably designed to be mechanically decoupled from other components above a selected oscillation frequency. In a collision, the equipment does not then act as a large mass colliding with the impacted object. Instead, the individual portions of the equipment are allowed to move relative to each other so as to provide mechanical decoupling and shock energy dissipation. The present invention describes a new approach for the design of a flexible, decoupled equipment system. There are two design approaches, both utilizing energy absorptive structures, but with different geometry.

The first embodiment has an external shell which provides a mechanical support function. It is designed to be flexible but is in fact a structural shell unlike what was used in the conventional chassis approach.

The novel design approach of this invention uses a rigid wall model for analysis of the flexible shell embodiment; for the flexible chassis embodiment, the model uses a two body approximation. This aproximation is also necessary for design of the shell structure if the shell becomes very compliant. The crossover point for the analysis is reached when the equivalent compliance of the shell equals the compliance of the damping material. The calculations are then made for both models and compared to the experimental results.

There are two procedures used in the practice of the invention to optimize the elastic properties of the connecting structures in an equipment package. The first uses a procedure employing a decoupled simple harmonic oscillator (SHO) model for the consideration of the movement of the equipment's internal components. Decoupled means that motions in the x, y, and z orthogonal system (or other coordinate system) are assumed to be independent. Thus, the 3-dimensional differential equation of motion for this system is assumed to separate into 3 equations, one for each direction. Therefore, only pure motion in the orthogonal coordinate directions is considered. The second procedure uses a more complicated algorithm employing a Finite Element Model (FEM) to determine the relative motion of the components. In both procedures the connecting elastic materials are selected to ideally produce a critically dampened motion at a chosen frequency for each component. Both procedures must be employed iteratively, in that the initial choice of materials for the specific component shapes and masses will in general not be optimum due to the approximations necessary for the geometry. Further, the modeling may also not be optimum because the damping materials are often hysteretic and have time dependent damping and elastic properties. Thus a mixture of an experimental with a calculational approach is necessary.

Figure 1:
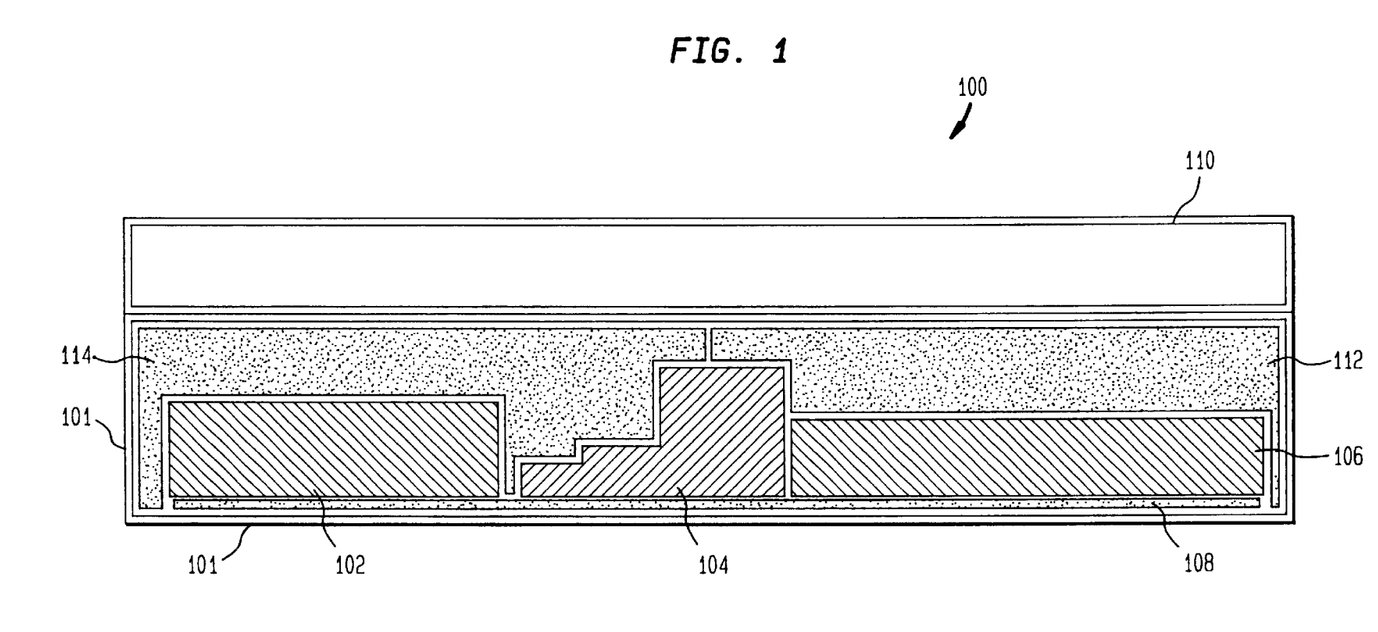
FIG. 1 shows a flexible shell embodiment of the invention.

FIG. 1 shows a flexible shell configuration (here computer 100) in accordance with the invention. FIG. 1 shows several flexibly mounted components, i.e., a battery 102, the electronics 104, and a DASD 106 surrounded by elastically different fillers 108, 112, 114 all of which are surrounded by a partial or complete flexible shell 101. A display is in the cover 110 that is provided with its own shock isolation. The structural integrity of computer 100 is provided by fillers that fill what would otherwise be empty spaces and provide rigidity. The rigidity and damping of the fillers can be adjusted over very wide ranges by changing the filler materials and, in the case of foam and plastic fillers, softener additives may be used in a manner known to those familiar with the art. A vendor of suitable filler materials is EAR Specialty Composites, Indianapolis, Ind. 46268.

It is desirable that the filler material is made to adhere to all the surfaces with which it makes contact. Thus filler 108 can expand, and filler 112 can be compressed when DASD 106 moves toward cover 110. When DASD 106 moves away from cover 110, filler 108 is compressed and filler 112 expands. If the filler is not attached to the components it can only compress but cannot expand. Battery 102 is more massive than the other components. Thus a chassis-like component, e.g., a flexible strap (not shown in FIG. 1), is used to anchor the battery to the shell and the DASD.

Figure 2:
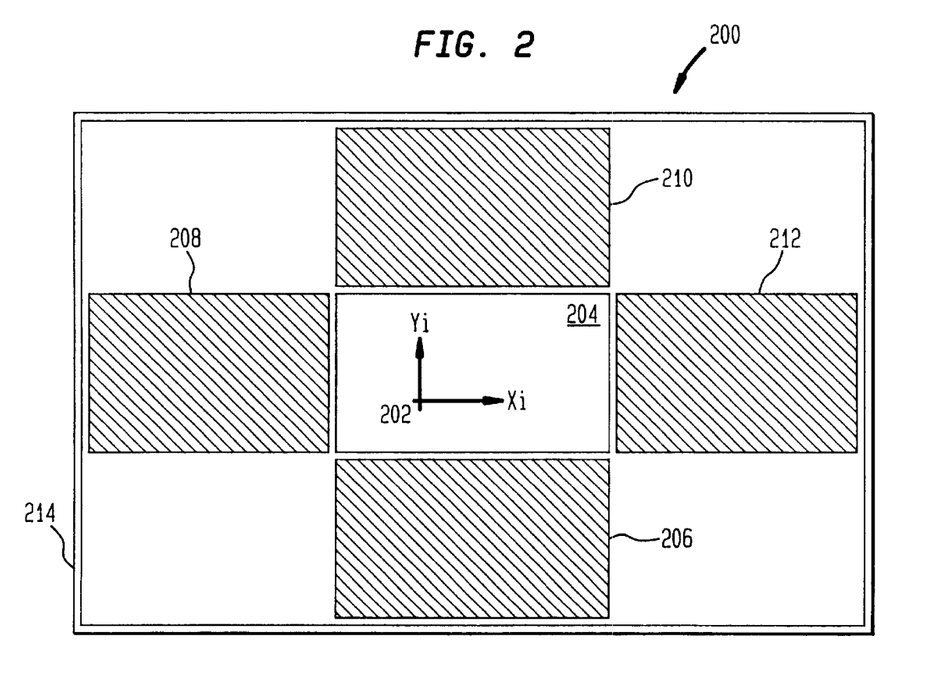
FIG. 2 shows a two-dimensional model equipment assembly for calculation purposes.

The first procedure treats the equipment's assembly as a set of independent, decoupled SHOs. Consider the general and simplified model equipment assembly 200 shown in FIG. 2. FIG. 2 shows assembly 200 in a direction looking down on the equipment's x-y plane 202. A component 204 is shown constrained by elastic fillers 206, 208, 210 and 212 between the flexible walls of equipment case 214. The walls, according to the principle of the invention, are flexible. However, for purposes of simplicity of analysis and an initial determination of the elastic and damping coefficients, they are assumed to be rigid. In this procedure, each coordinate axis is treated independently and motions in one are assumed not to be coupled to motion along any other directional axis. This is an approximation as in general the x, y and z motions are not independent of each other and are coupled by the various vibrational modes. The elastic and damping properties of each filler component are independently specified in the x, y, and z directions. Thus, the material in general is anisotropic, a property which can be achieved by layering of different materials. Because impacts are equally likely in the positive and negative (e.g., +x and −x) directions the material's elastic and damping coefficients are made to be the same on both sides of each object, i.e., the values for 208 and 212 are assumed to be the same.

The elastic coefficient, k, is found from:

$$k = (2\pi f)^2(m) = (\omega)^2(m) \qquad (1)$$

where "m" is the mass of the object, "f" is the chosen critical frequency for object 204 when surrounded by the elastic fillers and "ω" is the angular frequency. In a particular case, the designer may choose a different critical frequency for each object/filler combination based on the designer's experience and design criteria for the complete equipment system. Inherent in the designer's experience and design criteria are tangibles such as material compliance and damping coefficients (factors) and intangibles such as the "look and feel" of the finished product which of necessity involves a balancing between softness of structure and realistic shock attenuation. Most of the time, the same frequency will be chosen for all object/filler combinations modelled.

Figure 3:
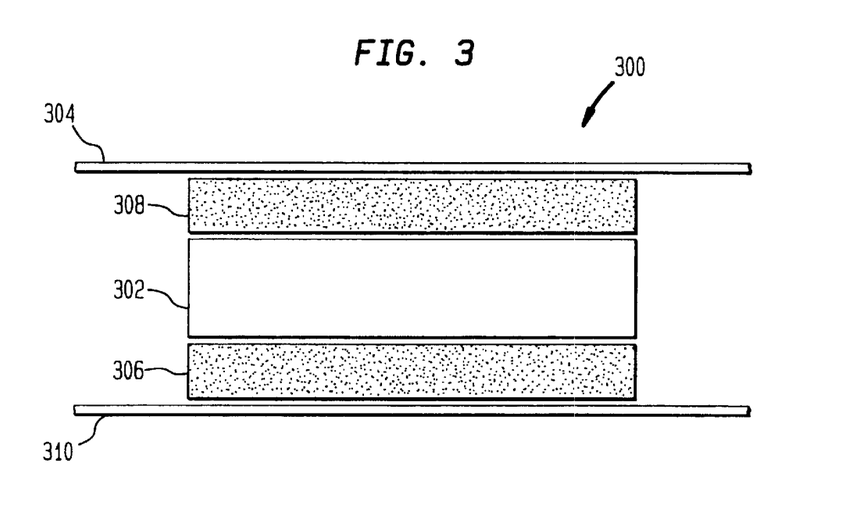
FIG. 3 shows a model of a single object, single axis equipment assembly for calculation purposes.

An example of a single object, single axis model structure is shown in FIG. 3. The object is DASD 302 located between the walls 304, 310 of equipment shell 300. DASD 302 is separated from wall 304 along the +z axis by damping material 308, and from the wall 310 along the −z axis by damping material 306. A typical critical frequency may be chosen for DASD 302 to lie between about 500 Hz and about 2000 Hz. Lower frequencies are generally more desirable, since this provides higher attenuation of the shock propagation, but requires softer materials which may not be acceptable for the package. Use of softer materials will also result in larger displacements which again may not be desirable.

Figure 4:
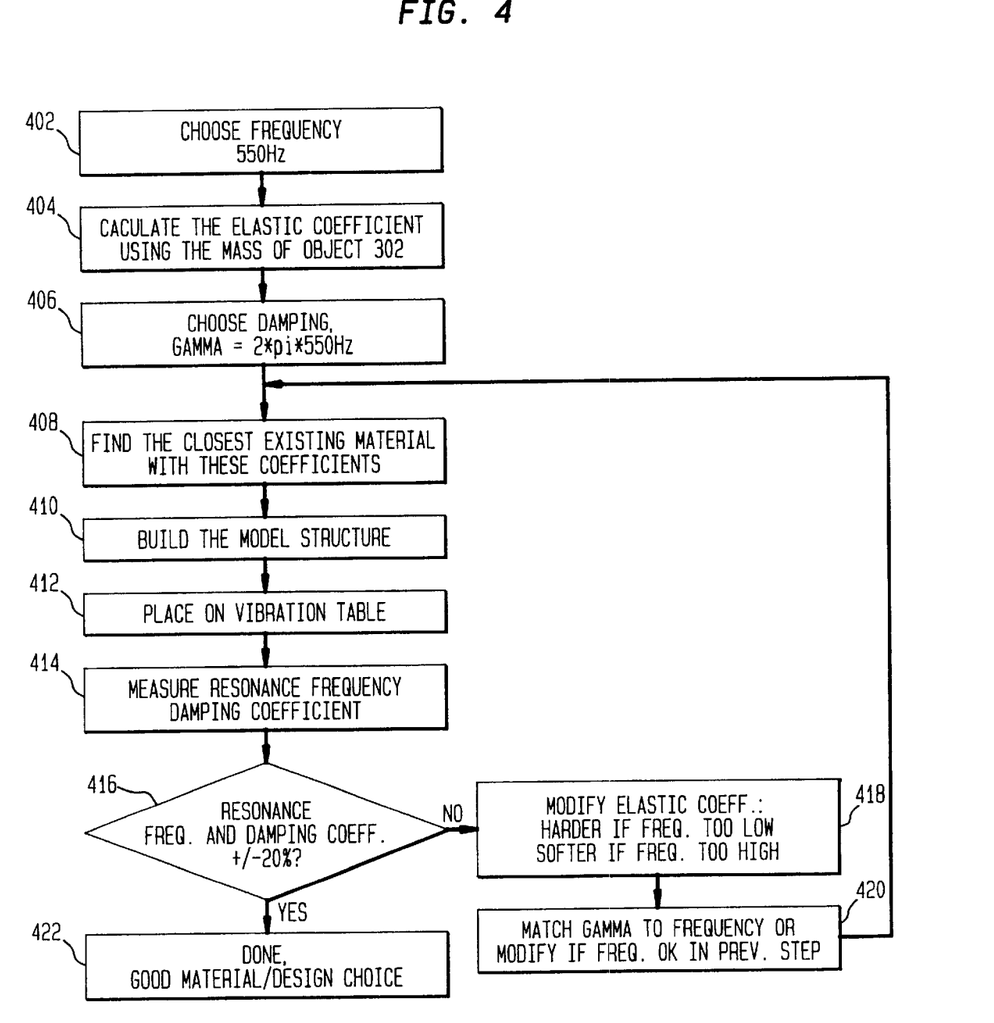
FIG. 4 is a flow chart of the design process of the invention using the simple harmonic oscillator model.

The optimization process is illustrated with the aid of FIG. 4. To start the process, as shown at 402, a frequency of 550 Hz is initially selected. The elastic coefficient, k, is then calculated. In addition, the damping coefficient, γ, for the material must be chosen (406). Ideally, the system is critically damped which is the condition at which the amplitude decays the most quickly. This condition obtains when γ=ω where γ is defined by:

$$(d^2x/dt^2) + 2\gamma(dx/dt) + \omega^2 x = 0 \qquad (2)$$

A filler material that has the selected k and γ (or the closest one thereto) is used to form the damping materials 306, 308. As shown in FIG. 4, the next step 410 is to build the model structure. The structure (system) is placed on a vibration table and the resonance frequency and damping coefficient are measured. If the measured values are not close enough to the selected design values, shown in box 416 to be +/−20% for illustration, the filler is first modified to be softer to lower the resonant frequency or stiffer to raise the resonant frequency. If the response is underdamped or overdamped, the damping coefficient γ needs to be adjusted. This process is repeated iteratively until the specified design values are achieved or are in tolerance, which need not be the same for both resonance frequency and damping.

Figure 5:
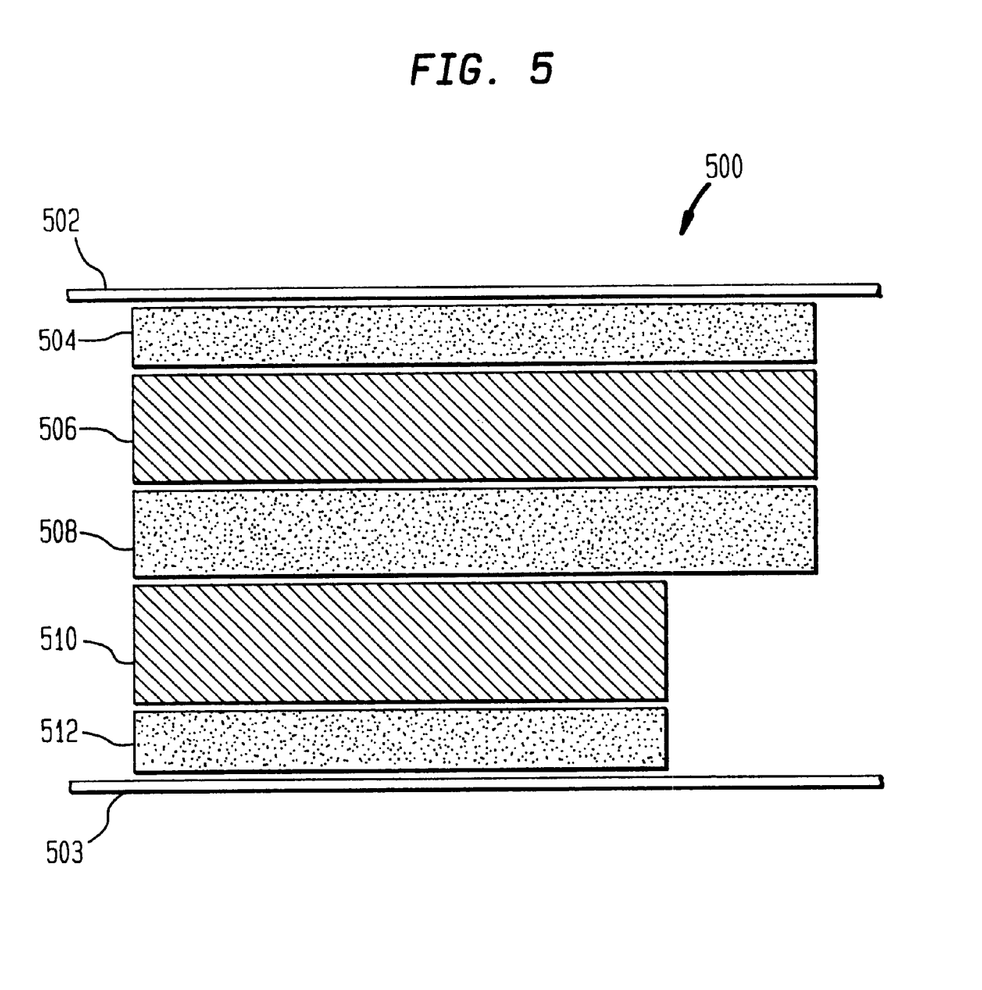
FIG. 5 shows a two body assembly formed from two stacked objects separated by elastic materials.

FIG. 5 shows an assembly 500 formed from two stacked objects. It shows a DASD 506 separated from equipment wall 502 by an elastic body 504. A battery 510 is separated from DASD 506 by a second elastic body 508 and is separated from a second equipment wall 503 by a third elastic body 512. This is a configuration which can be solved exactly. The initial resonance frequencies are given by the frequencies as if 508 is not present, which are then raised and lowered by an offset frequency due to 508. The optimizing procedure is as follows: first elastic material 504 and 512 are selected so that the frequencies of the mass spring system 504, 506 and 512, 510 are equal. The coupling due to 508 will split the frequencies by the offset which depends on:

$$k^2 = \frac{k_{508}}{\sqrt{m_{506} m_{510}}} \qquad (3)$$

The stiffness $k_{508}$ of elastic 508 is chosen so that the split is small, i.e., the frequencies are all near the chosen value. The damping is then selected so that the frequencies are approximately critically damped. This will optimize the composite system response.

An improved procedure, the finite element method, obtains a more accurate estimate of the system's vibrational modes. As used herein, a vibration mode is the amplitude of each system component at the particular resonance frequency observed. Each mode considers the entire system assembly and takes into account the coupling between components. Even though the entire assembly is considered, not every component contributes to the motion because the motion has vibrational nodes. If a component lies in an area of a node, where the amplitude is zero, then the component does not move. Actually, this is only an approximation, because of the spatial extent of the modes. A moderately sized component in general will experience some motion in various portions of the component. An additional advantage of the FE method is that the objects can be modelled closer to their actual dimensions whereas the SHO model requires that the objects be in simplified form.

The finite element method is used to calculate the vibrational pattern for the entire structure. It accounts for the cross coupling between the elements and coordinates. The accuracy of the finite element method decreases for high frequency modes, which fortunately do not play any significant role in this application. Here, only the lower frequency modes are important. This is because the lowest modes tend to be the strongest. Higher frequency modes tend to be less pronounced in amplitude and less troublesome from a shock damage point of view. Also, the elastic properties of the soft materials used are generally such as not to couple the higher modes.

Figure 7:
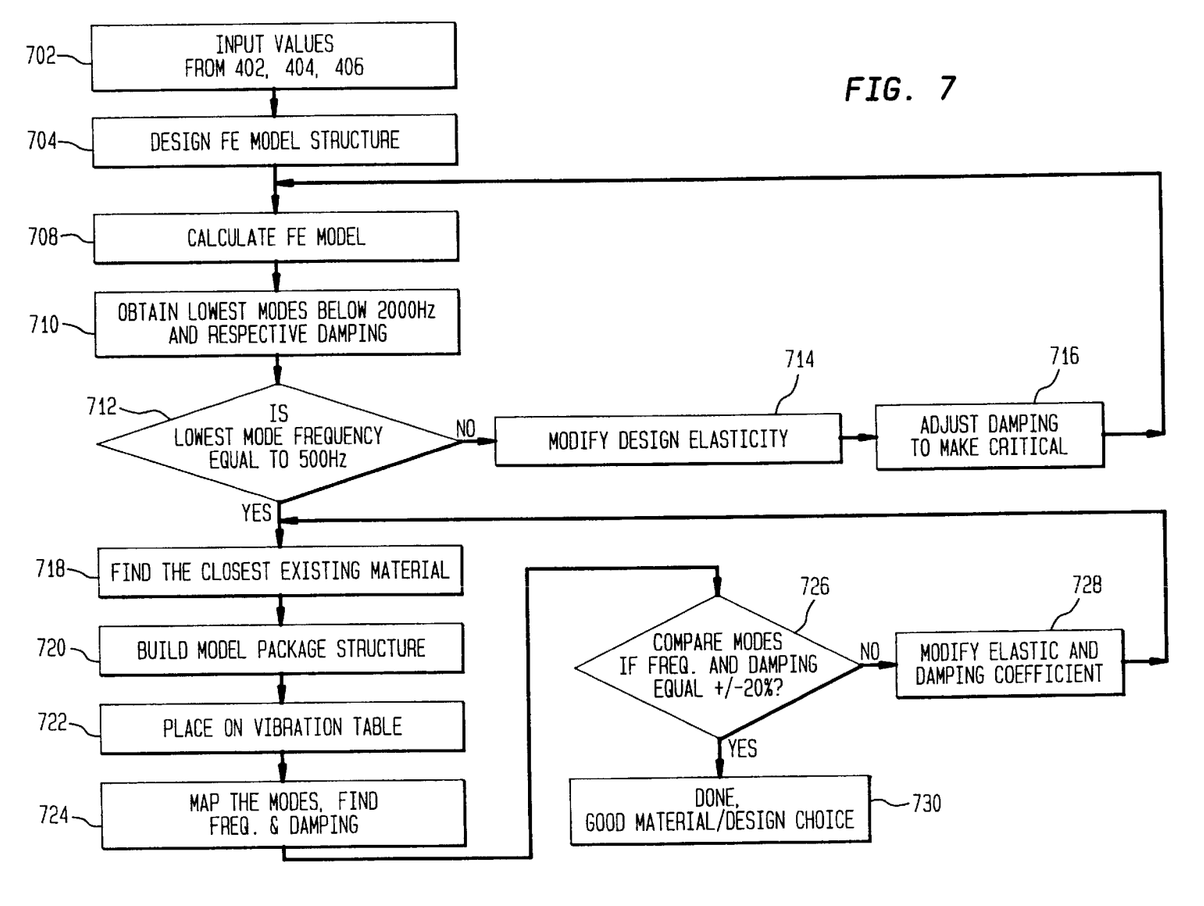
FIG. 7 is a flow chart of the design process of the invention using the finite element model method.

The finite element method, FIG. 7, requires the elastic properties of the constituent materials as its input. Since there is no a priori knowledge of the mechanical properties of the system (that is what is to be determined), an initial guess and simplification are made, similar to the process for the analysis with the SHO method. Steps 402, 404 and 406 are performed which yields a set of elastic and damping coefficients. These coefficients are used as the starting values for the elastic properties of the components in the finite element method, box 702. Next, in box 704, the finite element model of the package is created as is familiar to those who use finite element methods.

The finite element model is then calculated (as in "run" by a computer), the output of which (710) is, among other things, a list of modes. The list starts with the lowest mode and is unlimited toward the higher frequencies. Those below a predetermined upper limit, here 2000 Hz for illustration, are selected. The modes are also tested to determine whether any are below a predetermined lower limit, here 500 Hz for illustration. If there are any below the lower frequency limit, the model package is adjusted (714, 716) and rerun. This procedure yields a set of calculated elastic and damping coefficients. As in the SHO model, the experimental package is built (718, 720) and tested (722, 724). If there is agreement within the desired tolerance, here +/−20%, the process is complete. Otherwise, the experimental parameters are changed (728) to bring the model package closer to the modeling results and the process is repeated.

Figure 6:
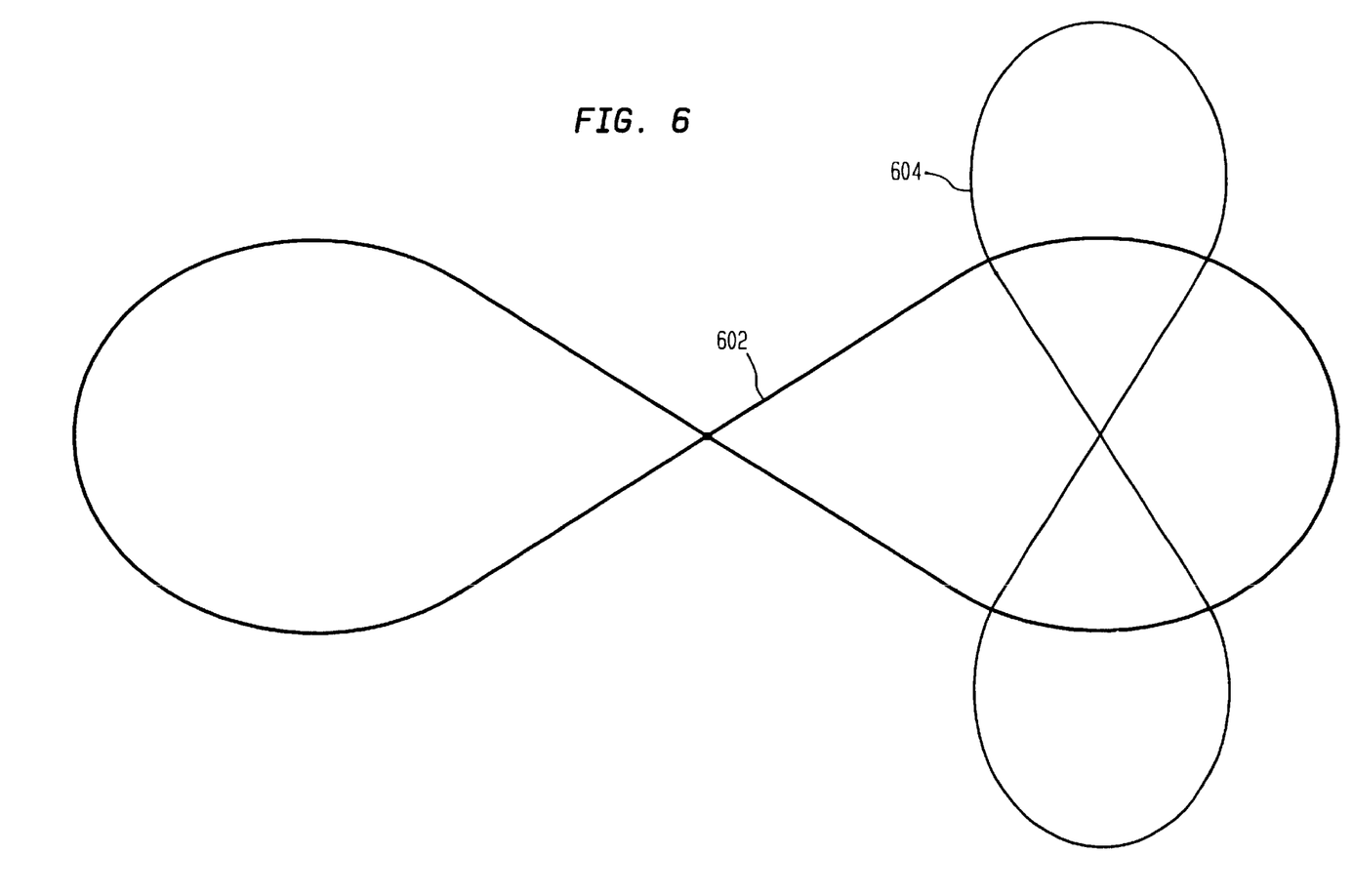
FIG. 6 shows a plot of a mode pattern resulting from external shock and vibration.

A typical mode pattern is shown in FIG. 6. FIG. 6 shows a plot of an equal amplitude contour in an object being vibrated. The modes shown here are for illustrative purposes only. Simple mode shapes like those in FIG. 6 are observed only in isotropic bodies. The mode shapes for a laptop computer, for example, will be far more complicated. Each contour describes the object's motion of vibration at a particular frequency and in this example outlines a figure-eight. A first mode curve 602, corresponds to the motion of the object at a frequency of 800 Hz. A second mode curve 604, corresponds to the object's motion at a frequency of 2140 Hz.

If the final structure becomes too soft for actual use, the target frequencies are revised (raised) and the design procedure is repeated. This results in a unified shock absorbing structure. In this way every component contributes to absorption of a received shock.

Figure 8:
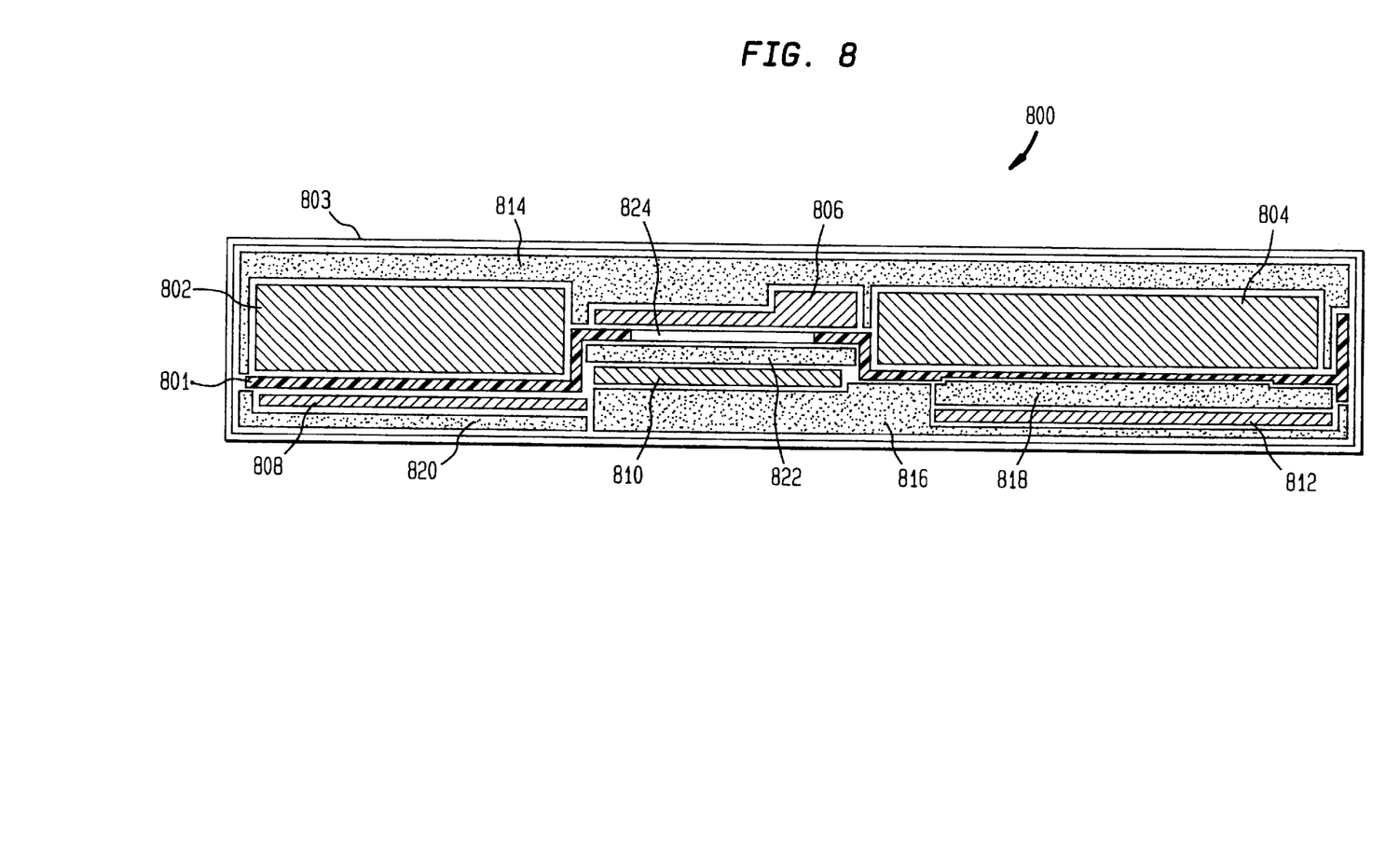
FIG. 8 shows a flexible chassis embodiment of the invention.

The flexible chassis embodiment, illustrated for laptop computer 800 (with cover/display not shown) is shown in FIG. 8. FIG. 8 shows DASD 802, battery 804 and four electronic modules 806, 808, 810 and 812. Chassis 801 is located wholly in the interior of the package structure. The chassis is a frame or structure whose function is to provide the majority of the mechanical support for the individual components. It is shaped to accomodate the the various components and may be molded or die cast and may have a varying cross-section. It may be made of layers of different materials (i.e., laminated).

The spaces between the various components and surface 803 are provided with elastic fillers 814, 816, 818, 820 and 822 which generally will have different material characteristics (e.g., elasticity and damping) in accordance with the invention. Chassis 801 is shown in FIG. 8 with an optional aperture 824 to make chassis 801 more compliant in the area of the aperture. Optionally, aperture 824 may be filled with a different material to provide the desired local compliance. The filler materials are of the same kind as discussed above in connection with flexible shell embodiment. Again, the chassis and the fillers are optimized elastically and with respect to damping using the same methodology as above described. Outer surface 803 may be comprised of the outer surfaces of fillers 814, 816, 818, 820 and 822 or an overlayer or protective skin may be used as outer layer 803.

Analogous to varying the characteristics of the fillers, making the chassis out of molded plastics enables further compliance control by changing the composition of the plastics. In like fashion, the damping can be varied by changing the composition of the chassis materials with a different set of additives. In this context, the term composition is used to mean the chemical mixture of the plastics and additives to modify the stiffness and damping coefficients of the materials. Such additives and modifications are known in the damping materials arts as evidenced, for example, by Additives for Plastics, Seymour, R. B., ed., Academic Press (1978) and Thermoplastic Polymer Additives, Lutz, J. T., Jr., ed., Marcel Dekker (1989), which are incorporated herein by reference.

Although the description is made for particular arrangements of generally portable equipment, and more particularly for portable computers, the intent and concepts of the present invention are suitable and applicable to other equipment and arrangements. For example, it is also advantageous for portable test or communications equipment subject to rough handling, purely mechanical equipment and toys having electronic components. It will be clear to those skilled in the art that other modifications to the disclosed embodiments can be effected without departing from the spirit and scope of the invention.

What is claimed is:

1. A portable electronic device, comprising:
   a flexible shell;
   a plurality of flexible fillers attached to said shell, said flexible fillers being structural components of said device; and
   a plurality of electronic components attached to said fillers,
   wherein said fillers are selected based on characteristics of said components and said flexible shell has elastic and damping coefficients selected to be matched optimally to said plurality of electronic components,
   wherein said plurality of electronic components act as a highly damped flexible grouping such that the plurality of electronic components are allowed to move with respect to each other in a mechanically optimized way.

2. The device according to claim 1, wherein said fillers are selected optimally to match said electronic components to prove mechanical decoupling, damping and shock isolation of the electronic components such that an energy of a shock imparted on one object becomes one of attenuated and dissipated as the energy propagates toward another electronic component.

3. The device according to claim 1, wherein predetermined parameters of said plurality of fillers including at least one of compliance and damping are selected to optimally dissipate a kinetic energy of said electronic components undergoing at least one of a shock and vibration.

4. The device according to claim 1, wherein each of said electronic components is treated individually regarding their contribution to collective mechanical properties of said device.

5. The device according to claim 1, wherein a mounting of each individual electronic component in said device s designed to be optimally mechanically decoupled from other electronic components above a selected oscillation frequency.

6. The device according to claim 1, wherein individual portions of the device are movable relative to each other so as to allow optimal mechanical decoupling and shock energy dissipation.

7. The device according to claim 1, wherein said flexible shell comprises a shell, portions of said shell being at least partially flexible.

8. The device according to claim 1, wherein said filler materials adhere to all surfaces of said electronic components with which said filler materials makes contact therewith.

9. The device according to claim 1, wherein elastic and damping properties of each filler is independently specified in the X, Y and Z axis and selected to match optimally said electronic components so as to provide mechanical decoupling, damping and shock isolation of said electronic components,
   wherein a filler's elastic and damping coefficients are made to be the same on both sides of each electronic component, and
   wherein a same critical frequency is chosen for each electronic component and each said filler material modeled.

10. The portable electronic device of claim 1, wherein said device includes a multi-body system.

11. The portable electronic device of claim 10, wherein said multi-body system includes more than three vibrational modes.

12. The portable electronic device of claim 10, wherein accelerations of individual components of the multi-body system are optimally minimized relative to external shock excitation.

13. The portable electronic device of claim 1, wherein said device includes a plurality of internal degrees of freedom such that the device is modeled as a plurality of masses connected damped and elastically.

14. The portable electronic device of claim 13, wherein each component of said device is elastically and dissipatively connected with each other.

15. The portable electronic device of claim 1, wherein said device is designed by dividing said device into a plurality of portions and reconnecting the plurality of portions in an elastically and vibrationally optimized way, such that said device has more than three vibrational modes, and
   wherein a group of frequencies is associated with the plurality of portions such that accelerations of individual ones of said portions are optimally chosen relative to an external shock excitation.

16. The device of claim 1, wherein protection for said plurality of electronic components is mechanically optimized by determining optimal compliance and damping properties for the plurality of flexible fillers, said plurality of flexible fillers functioning as connecting materials for the electronic components.

17. A portable electronic device, comprising:
   a flexible shell;
   a plurality of flexible fillers attached to said shell, said flexible fillers being structural components of said device; and
   a plurality of electronic components attached to said fillers,
   wherein each of said plurality of fillers is formed from a filler material composition having predetermined elastic and damping coefficients selected to be matched optimally to said plurality of electronic components and arranged to provide shock damping to each of said plurality of objects, and
   wherein said fillers are selected based on characteristics of said components and said flexible shell has elastic and damping coefficients selected to be matched optimally to said plurality of electronic components,
   wherein said plurality of electronic components act as a highly damped flexible grouping such that the plurality of electronic components are allowed to move with respect to each other in a mechanically optimized way.

18. A device as in claim 17, wherein said filler material composition is a plastic.

19. A device as in claim 17, in which said material composition is a foam.

20. A device as in claim 17, wherein said fillers have a laminated construction to achieve the desired elastic properties.

21. A device as in claim 17, wherein said flexible shell is laminated.

22. A device as in claim 17, wherein at least one of said fillers has elastic and damping coefficients different from those of the other fillers.

23. A device as in claim 17, wherein said flexible shell is of a variable cross-section.

24. An device as in claim 17, wherein said portable electronic device comprises a computer.

25. A portable electronic device, comprising:
   a flexible chassis;
   a plurality of electronic components attached to said flexible chassis to thereby form an assembly; and
   a plurality of flexible fillers attached to said assembly to thereby define said package, said flexible fillers being structural components of said device,
   wherein said fillers are selected based on characteristics of said components and said flexible chassis has elastic and damping coefficients selected to be optimally matched to said plurality of electronic components,
   wherein said plurality of electronic components act as a highly damped flexible grouping such that the plurality of electronic components are allowed to move with respect to each other in a mechanically optimized way.

26. A portable electronic device, comprising:
   a flexible chassis;
   a plurality of electronic components attached to said flexible chassis to thereby form an assembly; and
   a plurality of flexible fillers attached to said assembly to thereby define said package, said flexible fillers being structural components of said device,
   wherein each of said plurality of fillers is formed from a filler material composition having predetermined elastic and damping coefficients selected to be matched optimally to said plurality of electronic components and arranged to provide shock damping to each of said plurality of electronic components, and
   wherein said fillers are selected based on characteristics of said components and said flexible shell has elastic and damping coefficients selected to be matched optimally to said plurality of electronic components, and
   wherein said plurality of electronic components act as a highly damped flexible grouping such that the plurality of electronic components are allowed to move with respect to each other in a mechanically optimized way.

27. A device as in claim 26, wherein said filler material composition is a plastic.

28. A device as in claim 26, in which said material composition is a foam.

29. A device as in claim 26, wherein said fillers have a laminated construction to achieve the desired elastic properties.

30. A device as in claim 26, wherein said flexible chassis is laminated.

31. A device as in claim 26, wherein said flexible chassis is of variable cross-section.

32. A device as in claim 26, wherein said chassis has regions of varying materials placed therein.

33. A device as in claim 26, wherein said chassis has one or more apertures placed therethrough.

34. A device as in claim 26, wherein at least one of said fillers has elastic and damping coefficients different from those of the other fillers.

35. An device as in claim 26, where said portable electronic device comprises a computer.

* * * * *